United States Patent [19]

Isa et al.

[11] 4,169,134

[45] * Sep. 25, 1979

[54] MANUFACTURING CHLORINE DIOXIDE WITH THALLIUM AND SILVER OR PALLADIUM CATALYSTS

[75] Inventors: Isao Isa, Misato; Morioki Shibuya, Shibukawa; Makoto Ebisawa, Kiryu, all of Japan

[73] Assignee: The Japan Carlit Co., Ltd., Tokyo, Japan

[*] Notice: The portion of the term of this patent subsequent to Sep. 27, 1994, has been disclaimed.

[21] Appl. No.: 856,990

[22] Filed: Dec. 2, 1977

[51] Int. Cl.² .............................................. C01B 11/02
[52] U.S. Cl. ..................................................... 423/478
[58] Field of Search ......................................... 423/478

[56] References Cited

U.S. PATENT DOCUMENTS

| | | | |
|---|---|---|---|
| 2,376,935 | 5/1945 | Persson | 423/478 |
| 3,563,702 | 2/1971 | Partridge et al. | 423/478 |
| 4,051,229 | 9/1977 | Isa et al. | 423/478 |

FOREIGN PATENT DOCUMENTS 1216447  12/1970  United Kingdom ..................... 423/478

Primary Examiner—Brian Hearn
Attorney, Agent, or Firm—Frishauf, Holtz, Goodman & Woodward

[57] ABSTRACT

Chlorine dioxide is generated very efficiently and safely by reducing a chlorate in a strong acid in the presence of a catalyst containing thallium ions together with palladium ions or silver ions.

4 Claims, 2 Drawing Figures

MANUFACTURING CHLORINE DIOXIDE WITH THALLIUM AND SILVER OR PALLADIUM CATALYSTS

BACKGROUND OF THE INVENTION

1. Field of the Invention

This invention relates to a process for manufacturing chlorine dioxide by reducing a chlorate in a strong acid in the presence of a catalyst.

2. Description of Prior Art

Chlorine dioxide is a commercially important material in such fields as pulp bleaching, water treatment and fat decoloring, and also has recently been used in the fields of denitration of industrial waste gases and removal of phenols from industrial sewage. Thus it is highly desirable to have a process by which chlorine dioxide can be manufactured economically. Further it is desirable to have a safe process in which the generation of chlorine dioxide ccan be easily controlled without any danger of explosion.

One of the methods for generating chlorine dioxide is to reduce a chlorate with a reducing agent in a strong acid. The reactions which occur are exemplified below, wherein, for the sake of illustration, the chlorate used is sodium chlorate and the reducing agent is hydrochloric acid.

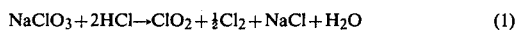

$$NaClO_3 + 2HCl \rightarrow ClO_2 + \tfrac{1}{2}Cl_2 + NaCl + H_2O \quad (1)$$

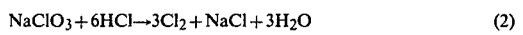

$$NaClO_3 + 6HCl \rightarrow 3Cl_2 + NaCl + 3H_2O \quad (2)$$

Further, the reactions which occur are exemplified below wherein the chlorate used is sodium chlorate, the reducing agent is sodium chloride and the strong acid is sulfuric acid.

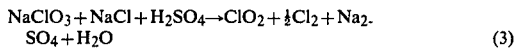

$$NaClO_3 + NaCl + H_2SO_4 \rightarrow ClO_2 + \tfrac{1}{2}Cl_2 + Na_2SO_4 + H_2O \quad (3)$$

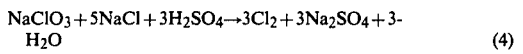

$$NaClO_3 + 5NaCl + 3H_2SO_4 \rightarrow 3Cl_2 + 3Na_2SO_4 + 3H_2O \quad (4)$$

Chlorine dioxide is formed by reaction (1) or (3), but not formed by reaction (2) or (4) which competes with reaction (1) or (3).

Accordingly, reaction (1) or (3) must be accelerated in order to generate chlorine dioxide efficiently. A useful method to achieve this purpose is to use a catalyst which accelerates reaction (1) or (3) in preference to reaction (2) or (4).

Palladium was described in Japanese Patent Publication No. 2,645/1970 as a catalyst for chlorine dioxide production. Vanadium pentoxide, silver ion, manganese ion, dichromate ion and arsenic ion were described in U.S. Pat. No. 3,563,702 for the same usage. Further, for the same purpose Japanese Patent Publications Nos. 4,119/1960, 7,301/1962, 14,958/1964, 17,047/1966 disclose manganese compounds; silver ion or a combination of silver ion and manganese ion; manganese(II) chelate compounds alone or combination of manganese chelate compounds and metal sequestering agents; lead ion or a combination of lead ion, manganese ion and silver ion; respectively. It is well known in the field of this invention that the ratio of the rate of reaction (1) or (3) to that of reaction (2) or (4) decreases at lower values of the chlorate-to-reducing agent molar ratio and at lower acid concentrations of the reaction medium. However, although the generation of chlorine dioxide under such conditions can be controlled more easily, those catalysts do not have satisfactory activities under the conditions described above. Even with palladium which shows the highest activity among them, the ratio of the rate of reaction (1) to that of reaction (2) found under the following conditions scarcely exceeds a value of 17: an acid concentration of 0.4 moles per liter of the reaction medium, a chlorate-to-reducing agent molar ratio of 0.27 and a palladium(II) concentration of 0.001 mole per liter of the reaction medium.

Recently, a process for manufacturing chlorine dioxide at lower acid concentrations and at remarkably high concentrations of a reducing agent (e.g., British Pat. No. 1,347,740) has been developed. Under such reaction conditions even more active catalysts are required in order to generate chlorine dioxide without loss of efficiency.

SUMMARY OF THE INVENTION

It is an object of this invention, therefore, to provide an excellent catalyst for efficiently manufacturing chlorine dioxide, said catalyst having a high catalytic activity even under the easily controllable conditions of low acid concentrations and low chlorate-to-reducing agent molar ratios of the reaction medium.

It is another object of this invention to provide a process for efficiently manufacturing chlorine dioxide by using an excellent catalyst which has a high catalytic activity even under the easily controllable conditions of low acid concentrations and low chlorate-to-reducing agent molar ratios of the reaction medium.

Other objects and advantages of the present invention may become apparent to those skilled in the art from the following description and disclosure.

DESCRIPTION OF THE PREFERRED EMBODIMENT

Figure 1:
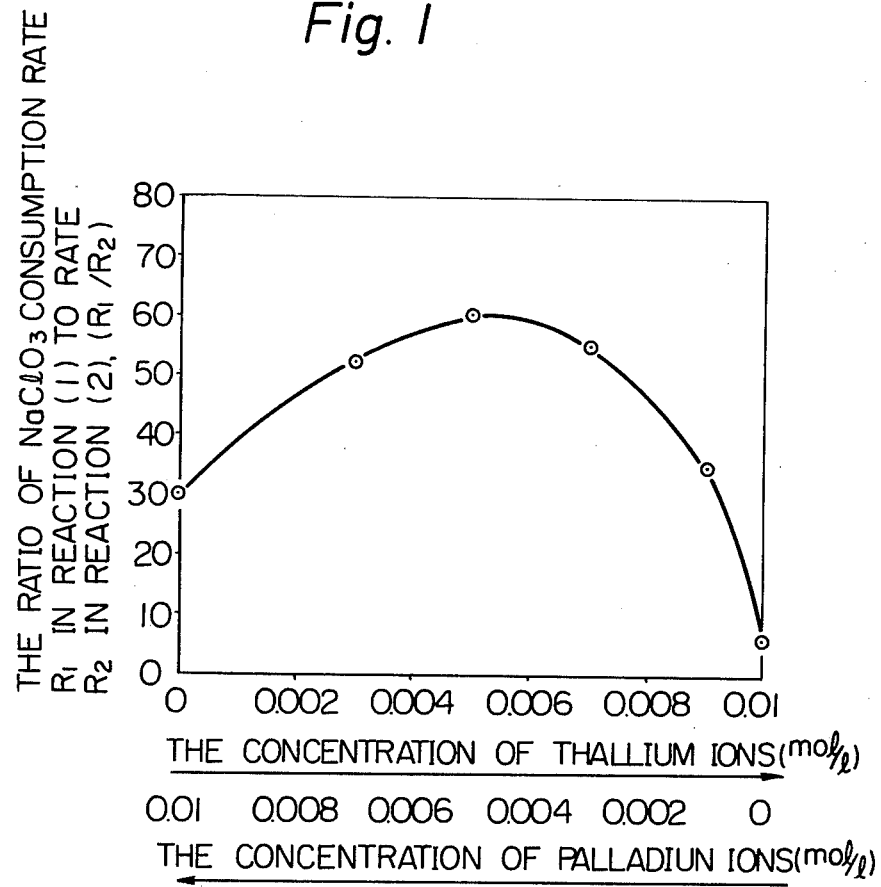
FIG. 1 shows the synergism experimentally found between thallium ions and palladium ions.

This invention relates to a process for manufacturing chlorine dioxide by reducing a chlorate in a strong acid in the presence of a thallium ion catalyst or a mixed catalyst consisting of said thallium ion catalyst and an ionic catalyst selected from the group consisting of silver ions, manganese ions, dichromate ions, lead ions and palladium ions.

The strong acid used in the process of this invention is selected from the group consisting of sulfuric acid, hydrochloric acid and a mixture thereof. The concentration of the sulfuric acid may be from about 0.5 to about 6 moles per liter of the reaction medium. The concentration of the hydrochloric acid may be from about 0.01 to about 4 moles per liter of the reaction medium. But if the concentration of sulfuric acid is below 0.5 or that of hydrochloric acid below 0.01 mole per liter, the rate of chlorine dioxide generation becomes too slow. On the other hand, if the concentration of sulfuric acid exceeds 6 or that of hydrochloric acid 4 moles per liter, the rate of reaction becomes too fast to assure safety.

Said chlorate is generally selected from the group consisting of sodium chlorate, potassium chlorate, calcium chlorate and magnesium chlorate. The concentration of the chlorate may be from 0.01 to 5 moles per liter of the reaction medium. If it is below 0.01 mole per liter, the rate of chlorine dioxide generation becomes too slow. On the other hand, if it exceeds 5 moles per liter of the reaction medium, it becomes too fast to assure safety in operation and the loss of the expensive chlorate increases.

As said reducing agent, sulfur dioxide, methanol, sodium chloride, calcium chloride, potassium chlorate or hydrochloric acid is commonly used.

The concentration of said thallium ion catalyst may be from 0.00001 to 0.1 mole per liter of the reaction medium. If it is below 0.00001 mole per liter, the rate of chlorine dioxide generation is not accelerated by a measurable amount. On the other hand, when it is above 0.1 mole per liter of the reaction medium, there is no particular advantage and the production cost becomes higher.

The preferred concentration of said thallium ion catalyst is from 0.00005 to 0.05 moles per liter of the reaction medium.

The compounds forming said thallium ion catalyst in the reaction medium include thallium chloride, thallium fluoride, thallium bromide, thallium iodide, thallium oxide, thallium hydroxide, thallium sulfide, thallium sulfate, thallium nitrate, thallium formate, thallium malonate and the like.

If the thallium ion catalyst is used together with any conventional catalyst, catalytic activity increases remarkably. As such catalysts, silver ions, manganese ions, dichromate ions, lead ions or palladium ions are used. The concentration of silver ions, manganese ions, dichromate ions, lead ions and palladium ions in the reaction medium may be from 0.00001 to 0.01 mole per liter, from 0.00001 to 1 mole per liter, from 0.00001 to 0.1 mole per liter, from 0.00001 to 0.1 mole per liter and from 0.00001 to 0.1 mole per liter, respectively.

The compounds of the silver ion catalyst include silver acetate, silver arsenite, silver bromide, silver carbonate, silver chloride, silver chromate, silver dichromate, silver fluoride, silver nitrate, silver nitrite, silver oxide, silver perchlorate, silver phosphate, silver sulfide, silver sulfate, silver sulfite, silver thiosulfate, silver chlorate, silver thiocyanate and the like.

The compounds forming the palladium ion catalyst in the reaction medium include palladium fluoride, palladium chloride, palladium bromide, palladium oxide, palladium sulfide, palladium nitrate, palladium nitrite, palladium sulfate, palladium thiocyanate, palladium ammonium chloride, palladium sodium chloride, palladium potassium chloride and the like.

The compounds forming the manganese ions catalyst in the reaction medium include manganese acetate, manganese ammonium sulfate, manganese phosphate, manganese bromide, manganese carbonate, manganese chloride, manganese dioxide, manganese hypophosphite, manganese nitrate, manganese formate, manganese pyrophosphate, manganese sulfate, manganese sulfite and the like.

The compounds forming the dichromate ions in reaction medium include zinc dichromate, ammonium dichromate, potassium dichromate, silver dichromate, sodium dichromate, barium dichromate, lithium dichromate and the like.

The compounds of the lead ion catalyst include lead acetate, lead arsenite, lead bromide, lead carbonate, lead chloride, lead fluoride, lead formate, lead hypophosphite, lead molybdate, lead nitrate, lead phosphate, lead phosphite, lead sulfate, lead sulfide, lead thiocyanate, lead vanadate and the like.

The thallium ion catalyst of the present invention accelerates the rate of reaction (1), but does not accelerate that of reaction (2). Accordingly, the catalyst increases the conversion from the chlorate to chlorine dioxide.

Furthermore, if the thallium ion catalyst is used together with the ions selected from the group consisting of silver ions, manganese ions, dichromate ions, lead ions and palladium ions, catalytic activity increases remarkably. For example, the ratio of the rate of reaction (1) to that of reaction (2) in hydrochloric acid was found to be 30 in the presence of palladium ions only, whereas a value of as high as 60 was obtained with a mixed catalyst consisting of thallium ions and palladium ions.

Advantages obtained with the present invention are as follows: The rate of reaction (1) is remarkably accelerated by adding the thallium ion catalyst or the mixed catalyst consisting of said thallium ion catalyst and conventional catalyst to the reaction medium even at low acid concentrations or low chlorate-to-reducing agent molar ratio. Accordingly, the volume of the reaction vessel required for generating chlorine dioxide at a given rate can be reduced remarkably from those most frequently used in the prior art. The concentrations of the chlorate and the strong acid in the reaction medium can be reduced by adding thereto the thallium ion catalyst or the mixed catalyst consisting of said thallium ion catalyst and a conventional catalyst. As a result, the generation of chlorine dioxide is controlled more easily and becomes more efficient. Furthermore, abnormal generation or explosion of chlorine dioxide can be avoided, since lower reaction temperatures can be used.

The following examples are given to further illustrate this invention, but it should be understood that the invention is by no means limited thereto. On the contrary, they are given only to clarify some of the essential working modes of the present invention.

EXAMPLE 1

One hundred and fifty ml of an aqueous solution containing NaCl and NaClO$_3$ were charged in a four-necked flask and the solution was kept at 70° C. One hundred and fifty ml of another aqueous solution containing HCl, NaCl and thallium chloride were heated up to 70° C. and was added to the first solution. Thus, chlorine dioxide was generated. The composition of the reaction medium was 0.4 mol/l HCl, 100 g/l NaClO$_3$, 200 g/l NaCl and 0.01 mol/l thallium ions. The reaction medium was agitated by introducing air thereto at about 500 ml/min and then the reaction medium and the gas phase were analyzed every 5 minutes.

The rate at which NaClO$_3$ was consumed by reaction (1), $R_1$, was 0.72 m mol/l·min and that by reaction (2), $R_2$, was 0.12 m mol/l·min while the concentration of HCl decreased to 0.3 mol/l. Accordingly, the ratio of $R_1$ to $R_2$ was 6.0.

REFERENCE EXAMPLE 1

The experiment of Example 1 was repeated but without thallium ions.

The rate at which NaClO$_3$ was consumed by reaction (1), $R_1$, was 0.24 m mol/l·min and that by reaction (2), $R_2$, was 0.13 m mol/l·min while the concentration of HCl decreased to 0.3 mol/l. Accordingly, the ratio of $R_1$ to $R_2$ was 1.8.

EXAMPLES 2-5 and REFERENCE EXAMPLE 2

The experiment of Example 1 was repeated except that a mixed catalyst consisting of thallium ions and palladium ions or a palladium ion catalyst was used.

The results obtained are given in Table 1 below.

Table 1

| Example or Reference Example | Concentration of catalyst (mol/l) Thallium ions | Concentration of catalyst (mol/l) Palladium ions | Rate at which NaClO$_3$ was consumed By reaction (1) R$_1$ (m mol/ l · min) | Rate at which NaClO$_3$ was consumed By reaction (2) R$_2$ (m mol/ l · min) | R$_1$/R$_2$ |
|---|---|---|---|---|---|
| Example 2 | 0.009 | 0.001 | 3.8 | 0.11 | 35 |
| Example 3 | 0.007 | 0.003 | 6.6 | 0.12 | 55 |
| Example 4 | 0.005 | 0.005 | 7.2 | 0.12 | 60 |
| Example 5 | 0.003 | 0.007 | 6.8 | 0.13 | 52 |
| Reference Example 2 | 0.0 | 0.01 | 3.9 | 0.13 | 30 |

The relation between the ratio of the rate at which NaClO$_3$ was consumed by reaction (1) to that by reaction (2) and the concentration of the mixed catalyst consisting of thallium ions and palladium ions in the reaction medium in Examples 1-5 and Reference Example 2 described hereinbefore are illustrated in FIG. 1.

FIG. 1 obviously shows a catalytic synergism between thallium ions and palladium ions.

EXAMPLES 6-8

The experiment of Example 1 was repeated except that the nature and the concentration of the catalyst were changed.

The results obtained are given in Table 2 below.

Table 2

| Ex. | Concentration of mixed catalyst Thallium ion (mol/l) | Concentration of mixed catalyst Additional catalyst ions | Concentration of mixed catalyst Additional catalyst Concentration (mol/l) | Rate at which NaClO$_3$ was consumed By reaction (1) R$_1$ (m mol/ l · min) | Rate at which NaClO$_3$ was consumed By reaction (2) R$_2$ (m mol/ l$^2$ · min) | R$_1$/R$_2$ |
|---|---|---|---|---|---|---|
| 6 | 0.001 | Mn$^{2+}$ | 0.005 | 6.0 | 0.12 | 50 |
| 7 | 0.001 | Cr$_2$O$_7^{2-}$ | 0.01 | 2.7 | 0.11 | 25 |
| 8 | 0.001 | Pb$^{3+}$ | 0.01 | 2.9 | 0.11 | 27 |

If manganese ions, dichromate ions and lead ions alone were used at a concentration in the reaction medium of as high as in Examples 6-8, the ratios of R$_1$ to R$_2$ were 24, 6, and 5, respectively. Accordingly, catalytic synergism was obviously proved between thallium ion and other catalysts.

EXAMPLE 9

One hundred and fifty ml of an aqueous solution containing NaCl and NaClO$_3$ were charged in a four-necked flask and the solution was kept at 70° C. One hundred and fifty ml of another aqueous solution containing H$_2$SO$_4$, NaCl thallium nitrate and silver nitrate heated up to 70° C. were added to the first solution. Thus, chlorine dioxide was generated. The composition of the reaction medium was 2 mol/l H$_2$SO$_4$, 100 g/l NaClO$_3$, 50 g/l NaCl, 0.0008 mol/l thallium ions and 0.0002 silver ions. The reaction medium was agitated by introducing air thereto at about 1.5 l/min and then the reaction medium and the gas phase were analyzed every 5 minutes.

The rate at which NaClO$_3$ was consumed by reaction (3), R$_1$, was 27.0 m mol/l·min and that by reaction (4), R$_2$, was 0.27 m mol/l·min while the concentration of H$_2$SO$_4$ decreased to 1.75 mol/l. Accordingly, the ratio of R$_3$ to R$_4$ was 100.

EXAMPLES 10-13 AND REFERENCE EXAMPLES 3-4

The experiment of Example 9 was repeated except that the concentration of the mixed catalyst consisting of thallium ions and silver ions was varied.

The results obtained are given in Table 3 below.

Table 3

| Example or Reference Example | Concentration of catalyst (mol/l) Thallium ions | Concentration of catalyst (mol/l) Silver ions | Rate at which NaClO$_3$ was consumed By reaction (1) R$_3$ (m mol/ l · min) | Rate at which NaClO$_3$ was consumed By reaction (2) R$_4$ (m mol/ l · min) | R$_3$/R$_4$ |
|---|---|---|---|---|---|
| Example 9 | 0.0008 | 0.0002 | 27 | 0.27 | 100 |
| Example 10 | 0.001 | 0.0 | 3.3 | 0.27 | 12 |
| Example 11 | 0.0006 | 0.0004 | 27 | 0.28 | 96 |
| Example 12 | 0.0004 | 0.0006 | 17 | 0.27 | 63 |
| Example 13 | 0.0002 | 0.0008 | 14 | 0.28 | 50 |
| Reference Example 3 | 0.0 | 0.001 | 11 | 0.28 | 39 |
| Reference Example 4 | 0.0 | 0.0 | 1.6 | 0.27 | 5.9 |

Figure 2:
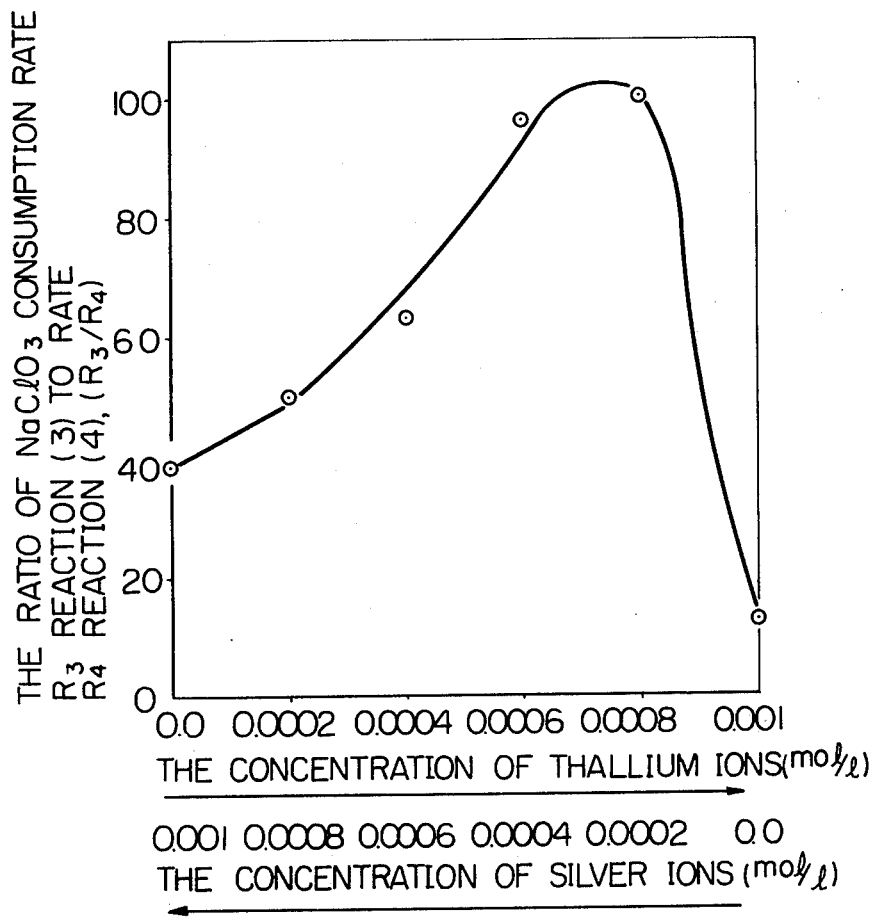
FIG. 2 shows the synergism experimentally found between thallium ions and silver ions.

The relation between the ratio of the rate at which NaClO$_3$ was consumed by reaction (3) to that by reaction (4) and the concentration of the mixed catalyst consisting of thallium ions and silver ions in the reaction medium in Examples 9-13 and Reference Examples 3-4 described hereinbefore are illustrated in FIG. 2.

FIG. 2 shows obviously the catalytic synergism between thallium ions and silver ions.

EXAMPLE 14

Two and one-half liters of an aqueous solution containing 100 g/l sodium chlorate, 240 g/l sodium chloride, 0.177 g/l palladium chloride and 2.40 g/l thallium chloride was filled in a reaction vessel and water was withdrawn therefrom at a rate of approximately 3 g/min under a reduced pressure of 195 mmHg at a temperature of 70° C. Concentrated hydrochloric acid and a 700 g/l sodium chlorate solution were continuously fed to the reaction vessel to maintain the volume and composition of the reaction medium substantially constant. Samples were taken every 30 minutes to analyze the gaseous mixture and the reaction medium. The mean composition of the reaction medium was found to be 0.2 mol/l in hydrochloric acid, 100 g/l sodium chlorate and 278 g/l sodium chloride.

The ratio of the rate at which NaClO$_3$ was consumed by reaction (1), R$_1$, to that by reaction (2), R$_2$, was 49.

The results reported in FIG. 1 establish that the best results are obtained when the thallium ions are in a concentration between 0.003 and 0.007 mol/l and the palladium ions are in a concentration between 0.007 and 0.003 mol/l. This is a preferred ratio of thallium ions to palladium ions of from 3:7 to 7:3. The data reported in FIG. 2 establishes that the best results are obtained when the thallium ions are in a concentration between 0.0004 and 0.0008 mol/l and the silver ions are in a concentration between 0.0002 and 0.0006. This is a ratio of thallium ions to silver ions of from 4:6 to 8:2.

What is claimed is:

1. A process for manufacturing chlorine dioxide by reducing a chlorate with chloride ions in a strong acid selected from the group consisting of sulfuric acid present in a concentration of from about 0.5 to about 6 moles per liter of reaction medium, hydrochloric acid in a concentration of from about 0.01 to about 4 moles per liter of reaction medium, and a mixture thereof, in the presence of a mixed catalyst consisting of (i) a thallium ion catalyst present in a concentration of from 0.00001 to 0.1 moles per liter of reaction medium, and (ii) an ionic catalyst selected from the group consisting of silver ions and palladium ions, when said ionic catalyst is silver, the ratio of said thallium ions to silver ions is from 4:6 to 8:2, and when said ionic catalyst is palladium, the ratio of thallium ions to palladium ions is from 3:7 to 7:3.

2. The process of claim 1, wherein said chlorate is selected from the group consisting of sodium chlorate, potassium chlorate, calcium chlorate and magnesium chlorate, the concentration of said chlorate being from 0.01 to 5 moles per liter of the reaction medium.

3. The process of claim 1, wherein said ionic catalyst is silver ions, said silver ions being present in a concentration of from about 0.00001 to 0.01 mole per liter of the reaction medium.

4. The process of claim 1, wherein said ionic catalyst is palladium ions, said palladium ions being present in a concentration of from 0.00001 to 0.1 mole per liter of the reaction medium.

* * * * *